United States Patent
Schwochert

(12) 
(10) Patent No.: US 6,543,426 B1
(45) Date of Patent: Apr. 8, 2003

(54) MULTILAYER FUEL TANK WITH COVER AND FUEL VAPOR COLLECTION CHAMBER

(75) Inventor: Hans Schwochert, Windsor (CA)

(73) Assignee: Schwochert Inc., Windsor (CA)

( * ) Notice: Subject to any disclaimer, the term of this patent is extended or adjusted under 35 U.S.C. 154(b) by 0 days.

(21) Appl. No.: 09/856,688

(22) PCT Filed: Feb. 18, 2000

(86) PCT No.: PCT/CA00/00167

§ 371 (c)(1), (2), (4) Date: May 24, 2001

(87) PCT Pub. No.: WO00/48859

PCT Pub. Date: Aug. 24, 2000

(30) Foreign Application Priority Data

Feb. 18, 1999 (CA) .............................. 2262295

(51) Int. Cl.[7] .............................................. F02M 37/00
(52) U.S. Cl. ........................................ 123/516; 123/519
(58) Field of Search ........................... 123/516, 509, 123/519

(56) References Cited

U.S. PATENT DOCUMENTS

| | | | |
|---|---|---|---|
| 3,426,937 A | * | 2/1969 | Boschi et al. |
| 3,804,291 A | | 4/1974 | Fricker ..................... 220/85 R |
| 3,917,109 A | | 11/1975 | MacDonald ............ 220/85 VS |
| 4,714,171 A | | 12/1987 | Sasaki et al. ........... 220/85 VR |
| 4,836,402 A | | 6/1989 | Sasaki ..................... 220/85 VS |
| 4,852,761 A | | 8/1989 | Turner et al. .......... 220/85 VR |
| 5,398,839 A | | 3/1995 | Kleyn ...................... 220/421 |
| 5,411,004 A | | 5/1995 | Busato et al. .............. 123/520 |
| 5,477,837 A | | 12/1995 | Ikebuchi ..................... 123/520 |
| 5,546,913 A | | 8/1996 | Aoki ......................... 123/520 |
| 5,547,096 A | | 8/1996 | Kleyn ...................... 220/4.14 |
| 5,839,285 A | | 11/1998 | Kniebes ..................... 62/48.1 |
| 5,840,104 A | | 11/1998 | Hashimoto et al. .......... 96/135 |
| 6,189,716 B1 | * | 2/2001 | Lawrukovich et al. ..... 220/4.14 |
| 6,409,040 B1 | * | 6/2002 | Distelhoff et al. .......... 220/562 |

FOREIGN PATENT DOCUMENTS

DE 3600177 A1 7/1986
DE 29918789 U1 4/2000

* cited by examiner

Primary Examiner—Thomas N. Moulis
(74) Attorney, Agent, or Firm—Dimock Stratton Clarizio LLP; Dino P. Clarizio

(57) ABSTRACT

A multilayered fuel tank (10) for a motor vehicle is disclosed having a fuel tank body (32) for holding liquid and vapor fuel comprising a bottom wall (46), side walls (45) and a top wall and a plurality of fuel tank components (35) located on the top wall and seams (37) located on the side walls. A tank cover (36) is connected to the fuel tank body to define a vapor collection chamber (34). The tank cover encapsulates the top wall and the fuel tank components and seams thereby trapping any fuel vapors that may escape from the tank body, the fuel tank components and the seams. Also disclosed is a method of making the multilayered fuel tank and a method of preventing fuel vapors from escaping from a fuel tank to the environment.

17 Claims, 3 Drawing Sheets

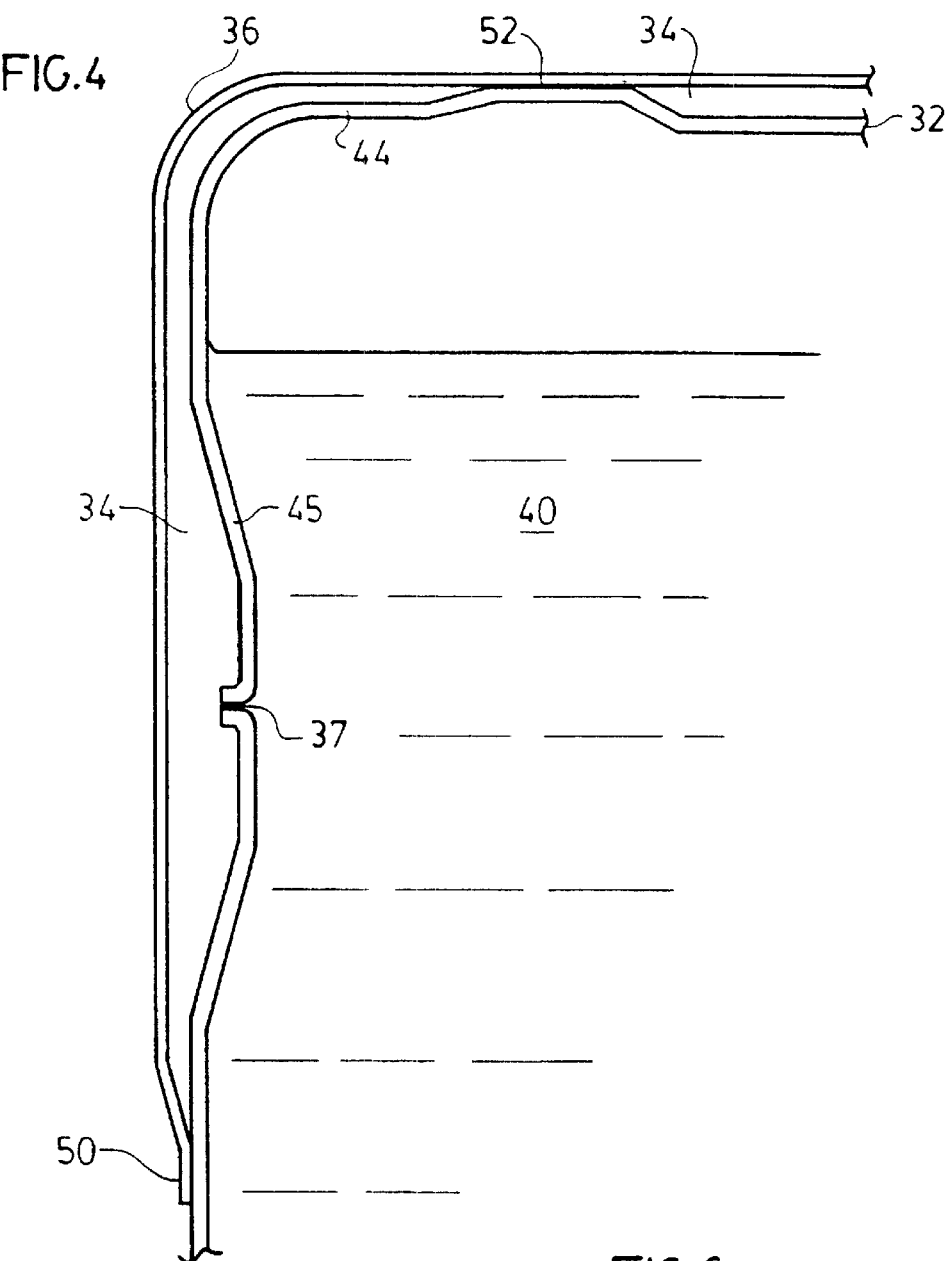
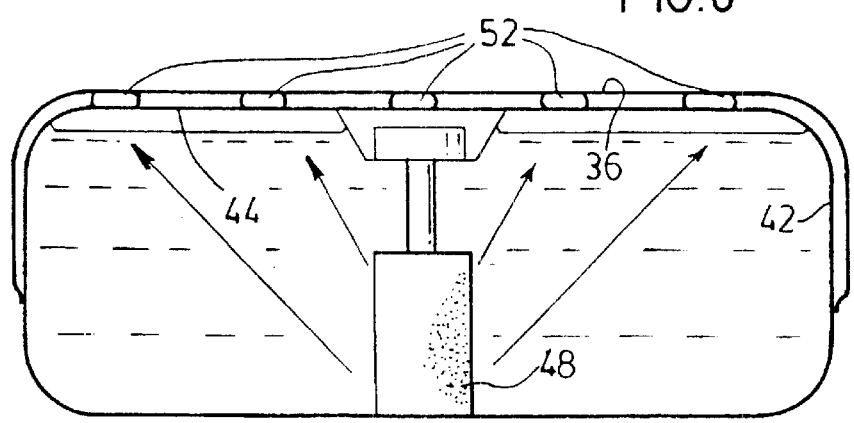

MULTILAYER FUEL TANK WITH COVER AND FUEL VAPOR COLLECTION CHAMBER

FIELD OF THE INVENTION

This invention relates to fuel tanks for automobiles, and in particular, to plastic multilayered fuel tanks that prevent hydrocarbon fuel vapours from escaping to the environment.

BACKGROUND OF THE INVENTION

Due to environmental concerns relating to the emission of hydrocarbon vapours from fuel tank systems in motor vehicles, the Government of the United States of America, amongst others, is now demanding that motor vehicle fuel tank systems built as of 2003 provide virtually no hydrocarbon vapour emissions to the environment. Moreover, the specifications will require that the fuel tanks maintain this low level of emissions during the lifetime of the motor vehicle.

Presently, a majority of motor vehicle fuel tank systems made are of plastic, however, one drawback is that they tend emit some amount of hydrocarbon fuel vapours to the environment. Most of these hydrocarbon vapour emissions occur through the fuel tank's hoses, connectors, seals, tank seams, etc. generally located at the top of the fuel tanks. FIG. 1 is a schematic sketch showing in general the emission of hydrocarbon vapours from these locations on the prior art fuel tanks.

The prior art has several examples of fuel tanks that include means for trapping liquid or vapour fuel. However, none of the prior art fuel tanks are designed and intended to prevent or minimize the leakage of hydrocarbon vapour to the environment.

U.S. Pat. No. 3,804,291 to Fricker discloses a venting and pressure release device for fuel tanks, in which a container (preferably made of synthetic plastic material) is provided on the inside of the fuel tank within the highest area and located at least partially above the maximum filling height. Fuel vapours in the fuel tank travel through a number of channels between the upper tank wall and the upper wall of the container to a dome structure mounted on or arranged on the top of the fuel tank before exiting the tank via another series of gaps and channels and a vent pipe. The dome may also be made in one piece with the upper container parts or mounted thereon.

Fricker also teaches a tank principle in which only one, possibly rigid line for the venting of the tank has to be extended to the outside so that connecting places located outside of the tank are eliminated.

U.S. Pat. No. 3,917,109 issued to MacDonald discloses a vent system that minimizes the possibility of vapour leakage to the atmosphere. It discloses a fuel tank for motor vehicles having a dome-shaped portion rising above the upper surface of the tank. The dome portion provides for a vapour space and in which a liquid-vapour separator is mounted. The separator is an enclosed container that serves as a locus for the collection of those vapours by flow thereof into a vapour vent conduit in addition to being a device for separating vapours from liquid fuel and acting as a baffle to prevent liquid fuel carryover.

MacDonald teaches that fuel vapours exit the fuel tank and the separator by entering a single vapour vent conduit that communicates between the interior of the separator and the exterior of the fuel tank. One end of the vapour vent conduit is extended into the doomed portion and the other end is extended to a charcoal canister and ultimately to an engine or any appropriate vapour receiving means on the motor vehicle.

U.S. Pat. No. 4,714,171 issued to Sasaki et al. discloses a vent system for venting fuel vapour from a fuel tank of a motor vehicle. The Sasaki vent system comprises a fuel tank constructed of moulded plastics with a depressed portion which protrudes into a vapour chamber defined at an upper portion of the interior of the fuel tank; a structure of moulded plastic which defines an enclosed chamber at a position above the maximum level of fuel in the fuel tank and means for fluid communication; namely, pipes, connectors and tubing.

Fuel vapours produced in the fuel tank are led into the enclosed chamber and the vapours are then led to a canister and trapped by the same. The enclosed chamber may be a deepened recess formed in an upward swelled portion of the fuel tank, or it may be the chamber of a separate vapour separator of moulded plastic which is either detachably mounted on the fuel tank or mounted on the upper wall of the fuel tank. The enclosed chamber may also have an opening having a lid sealingly attached to it.

U.S. Pat. No. 4,836,402 issued to Sasaki discloses a vent system for venting fuel vapour from a fuel tank of an automotive vehicle. The Sasaki fuel tank has a top wall, a vacant space between the top wall and the surface of fuel filled, and a separator chamber in the vacant space having a number of vent pipes for venting fuel vapour from the fuel tank. The fuel vapour is first drawn through the vent pipes into the separator chamber and then to a carbon canister outside the fuel tank.

U.S. Pat. No. 5,398,839 issued to Kyeln discloses a fuel tank encapsulated by an outer shell (preferably made of molded plastic material), and having a space between the outer shell and the fuel tank. Any liquid fuel leaking from the fuel tank is trapped by fuel absorbent material filling the space between the fuel tank and the outer shell and prevented from escaping to the environment. The Kyeln fuel tank may also be connected to a vapour recovery system. Kyeln also discloses an injection moulding apparatus for making such a fuel tank.

The present invention addresses these environmental problems associated with plastic fuel tanks, and also other problems as described below. Accordingly, it is an object of one aspect of the present invention to provide a fuel tank in which hydrocarbon vapour leaks from the tank body are contained and encapsulated within a separate vapour chamber. This additional vapour collection chamber of the fuel tank traps vapours instead of being released into the environment. In a preferred embodiment, the charcoal canister filter on the fuel tank is operatively connected to the vapour chamber for directing the leaked hydrocarbon vapours to the engine for combustion. It is another object of another aspect of the present invention to provide a method of preventing vapour fuel from escaping from a motor vehicle fuel tank to the environment.

SUMMARY OF THE INVENTION

Accordingly, in one aspect of the present invention, there is provided a multilayered fuel tank for a motor vehicle, comprising:

(a) a fuel tank body for holding liquid and vapour fuel comprising a bottom wall, side walls and a top wall;

(b) a plurality of fuel tank components located on the top wall and seams located on the side walls; and (c) a tank cover connected to the fuel tank body and defining a vapour collection chamber, the tank cover encapsulating the top wall and the fuel tank components and seams thereby trapping any fuel vapours that escape from the tank body, the fuel tank components and the seams.

In a second aspect of the present invention, there is provided an accessory for a motor vehicle fuel tank comprising a bottom wall, side walls, a top wall, seams and a plurality of fuel tank components located on the top wall, the accessory comprising:

a tank cover for connection to the fuel tank to define a vapour collection chamber, the tank cover protecting and encapsulating the top wall, the fuel tank components and the seams thereby trapping any fuel vapours that may escape from the tank body, the fuel tank components and the seams during use of the fuel tank.

In a third aspect of the present invention, there is provided a method of making a multilayered fuel tank for preventing the escape of fuel vapour to the environment, the method comprising:

(a) providing a fuel tank body for holding liquid fuel and vapour comprising a bottom wall, side walls and a top wall and a plurality of fuel tank components located on the top wall and seams located on the side walls; and (b) connecting a tank cover to the fuel tank body, the tank cover defining a vapour collection chamber and encapsulating the top wall and the fuel tank components and seams thereby trapping any fuel vapours that may escape from the tank body, the fuel tank components and the seams when in use.

In a further embodiment of the present invention, method is provided of preventing fuel vapour from escaping from a fuel tank for motor vehicles to the environment, comprising:

(a) providing a fuel tank body for holding liquid fuel and vapour comprising a bottom wall, side walls and a top wall, and a plurality of fuel tank components located on the top wall and seams located on the side walls;

(b) connecting a tank cover to the fuel tank body, the tank cover defining a vapour collection chamber and encapsulating the top wall and the fuel tank components and seams thereby trapping any fuel vapours that may escape from the tank body, the fuel tank components and the seams; and (c) directing the trapped fuel vapours through a charcoal cannister filter to the motor vehicle engine for combustion.

BRIEF DESCRIPTION OF THE DRAWINGS

The preferred embodiments of the present invention will be described with reference to the accompanying drawings in which like numerals refer to the same parts in the several views and in which:

FIGS. 3a, 3b and 4 illustrate the bonding of the tank cover to the fuel tank body;

FIG. 6 illustrates the sound proofing properties of the fuel tank of the present invention.

DETAILED DESCRIPTION OF THE PREFERRED EMBODIMENTS

Figure 1:
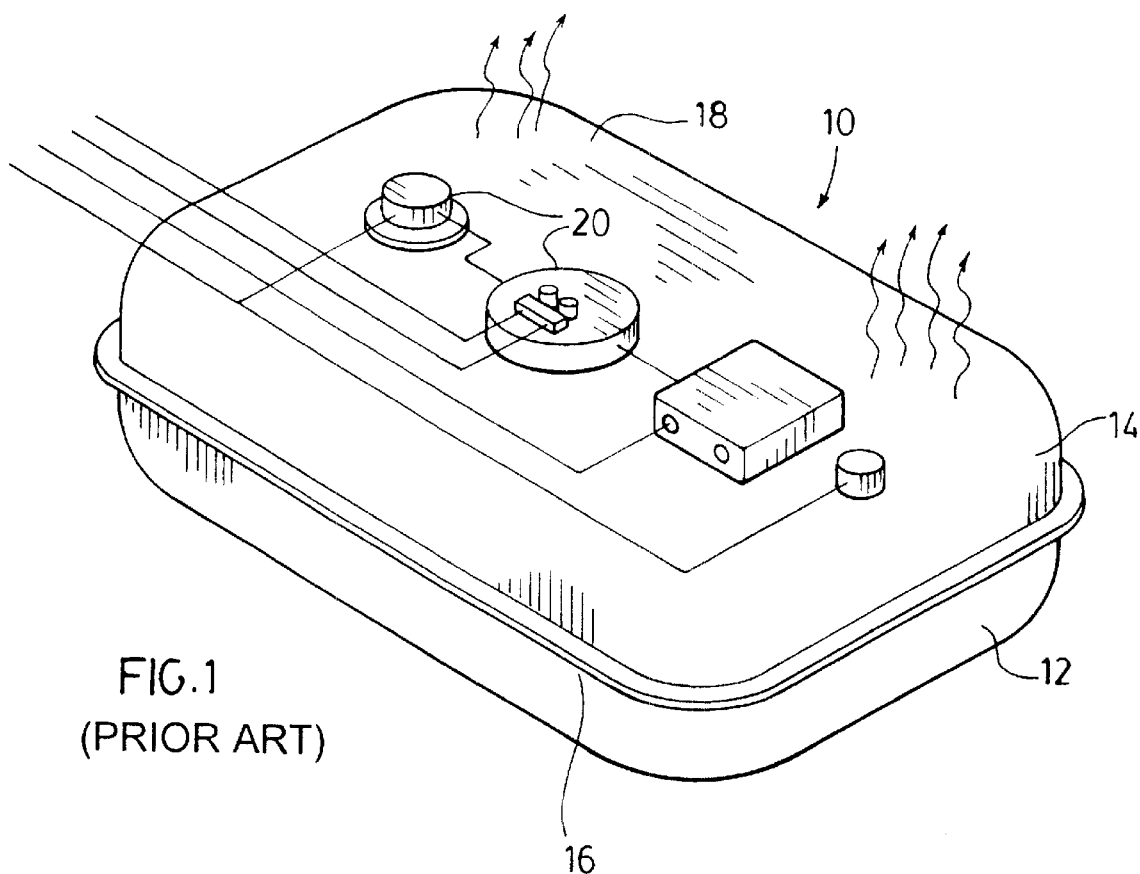
FIG. 1 is a schematic view of a motor vehicle fuel tank of the prior art illustrating the escape of hydrocarbon vapours.

FIG. 1 illustrates a typical motor vehicle fuel tank 10 currently used by motor vehicle manufacturers. The fuel tank 10 is generally constructed from two parts, a lower portion 12 and an upper portion 14 connected together at the seam 16. Located on the top wall 18 are the fuel tank components 20, which may include hoses, valves, connectors, charcoal canister filters and cables. FIG. 1 further illustrates areas on the fuel tank 10 that may cause hydrocarbon vapour leaks (designated by arrows).

Figure 2:
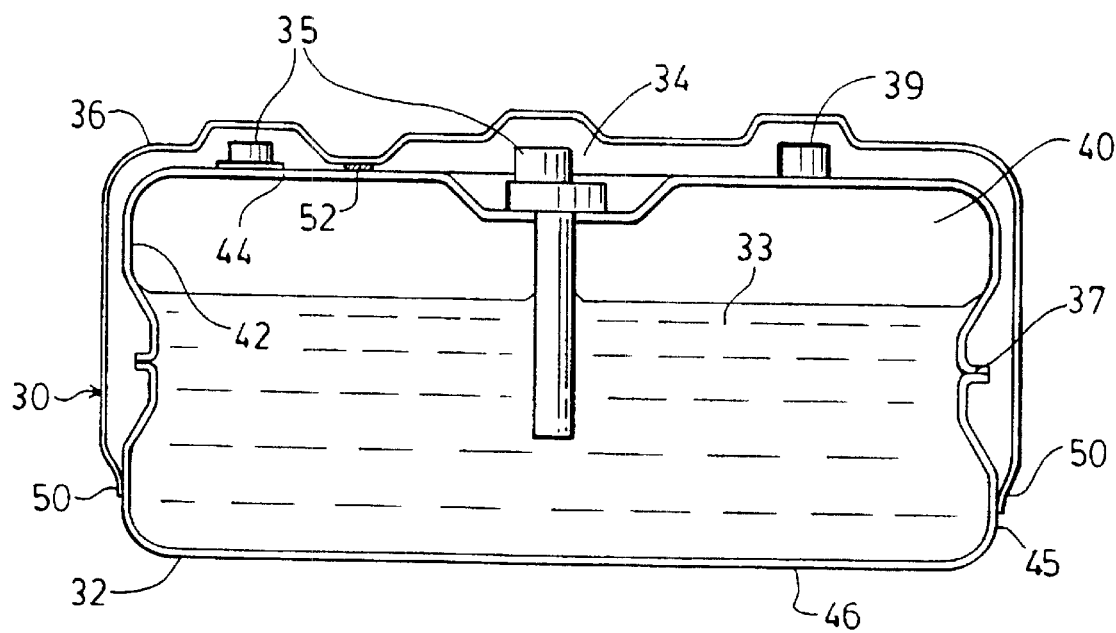
FIG. 2 is a cross-section view of one embodiment of the fuel tank of the present invention showing a cover bonded to a tank body and defining a vapour collection chamber.

FIG. 2 illustrates one embodiment of the multilayered fuel tank 30 of the present invention. The fuel tank 30 consists of a tank body 32 that holds liquid and vapour fuel, and an additional vapour collection chamber 34 or compartment that encapsulates all of the fuel tank's components 35 and seams 37 to trap any hydrocarbon vapours that leak therefrom. The hydrocarbon vapours trapped in the vapour collection chamber 34 are then directed to and captured in a charcoal canister filter 39 or the like and sent to the motor vehicle engine (not shown) for combustion as fuel.

The vapour collection chamber 34 is separate from the fuel reservoir 40 of the tank body 32 and is created above the tank body 32 by connecting a cover 36 over the upper portion 42 of the fuel tank 30 to provide a space (the vapour collection chamber 34) encapsulating all the tank components 35 (such as valves, hoses, connectors, etc.) and tank seams 37. As a result, all hydrocarbon vapours emitted through the tank components 35 and seams 37 are captured within the vapour collection chamber 34.

The cover 36 used to create the vapour collection chamber 34 is connected or bonded to the side walls 45 of the tank body 32 or to another suitable location on the tank body 34 so as to prevent the hydrocarbon vapours from escaping to the environment. Preferably, the cover 36 encapsulates the tank body seams 37 so as to capture fuel vapour that may leak from the seams 37. The shape of the cover 36 generally parallels that of the top wall 44 and tank components 35. The space between the cover 36 and the top wall 44 and tank components 35 is generally about 1 mm to 3 mm, but it may be greater in the area where tank components 35 are located.

The cover 36 may be made from any number of suitable materials. For example, it can be made of high-density polyethylene, or it may be made of the same material from which the tank body 32 is made (typically a six layer barrier material), or of any other suitable material.

Optionally, the cover 36 defining the vapour collection chamber 34 can be made of one or more separate cover pieces or segments that are then connected together and sealed over the upper portion 42 of the tank body 32. The cover 36 may also include a removable cap (not shown) to allow access into the vapour collection chamber 34 for servicing of the fuel tank components 35.

As illustrated in FIG. 2, it will be understood that the cover 36 may be connected to any part of the tank body 32 so long as the cover 36 defines a vapour collection chamber 34 that insulates and encapsulates most if not all of the areas through which hydrocarbon vapour emissions occur. In the particular embodiment of FIG. 2, the cover 36 is connected at locations 50 below the tank seams 37 and at one location 52 on the top wall 44.

The hydrocarbon vapour emissions that are trapped within the vapour collection chamber 34 can then be directed through a charcoal canister filter 39 operatively connected to the chamber 34 and to the motor vehicle's engine where they are combusted.

The cover 36 of the present invention also allows the option of locating the charcoal canister filter 39 on the top wall 44 of the tank body 32, rather than at a remote location in the motor vehicle. This has the advantage that the canister filter 39 and any connections, hoses, etc. to the filter 39 are located within the vapour collection chamber 34, hence reducing hydrocarbon emissions from the filter 39 and thereby eliminating a further source of emissions.

In one embodiment of the present invention, the multi-layered fuel tank 30 may be supplied with the cover 36 installed on the tank body 32. In another embodiment, the cover 36 may be provided as an accessory that is connected to currently used fuel tanks (such as that shown in FIG. 1) prior to installation of the fuel tank in a motor vehicle.

The cover 36 is connected to the upper portion 42 of the tank body 32, so that the lower portion 46 remains uncovered to allow for the direct strap/tank contact needed to secure the fuel tank 30 to the motor vehicle. Thus, the cover 36 is not an outer container containing an inner fuel tank. Moreover, there is no direct connection between the vapour collection chamber 34 and the reservoir of the tank body 32.

The cover 36 may be manufactured using known injection and blow moulding processes. A typical process may comprise blow molding two covers per cycle in one mould, with the cover's wall comprising five layers and having a thickness of approximately 2 mm. The two covers may then be separated by robot cutting and connected to the tank body by gluing or by plastic-welding methods such as infrared contact free welding, ultrasonic welding and emabond. Alternatively, the cover 36 may be direct moulded onto the fuel tank body 32.

Figure 3A:
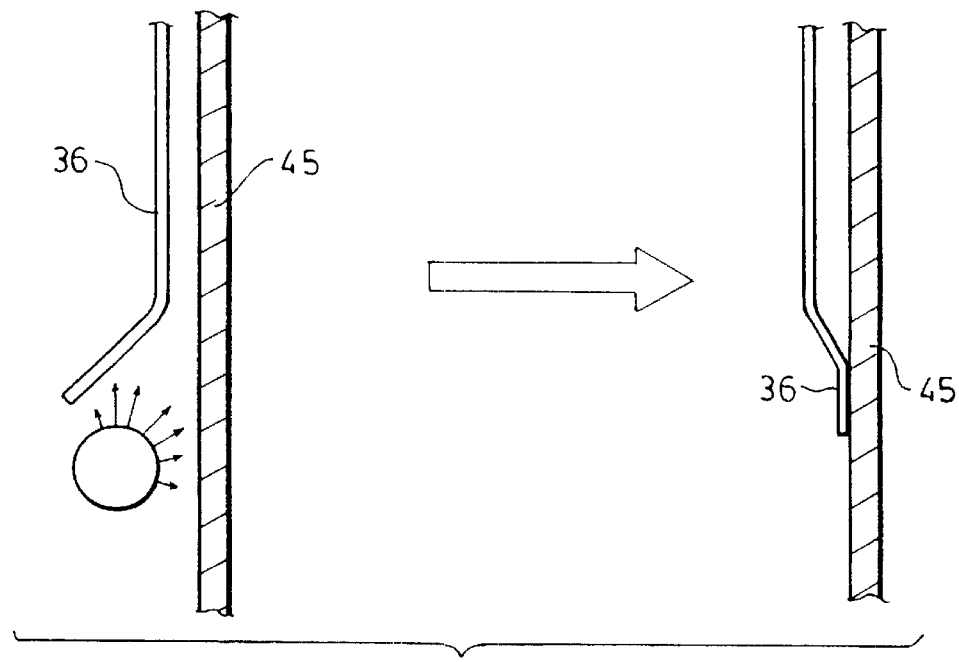
Figure 3B:
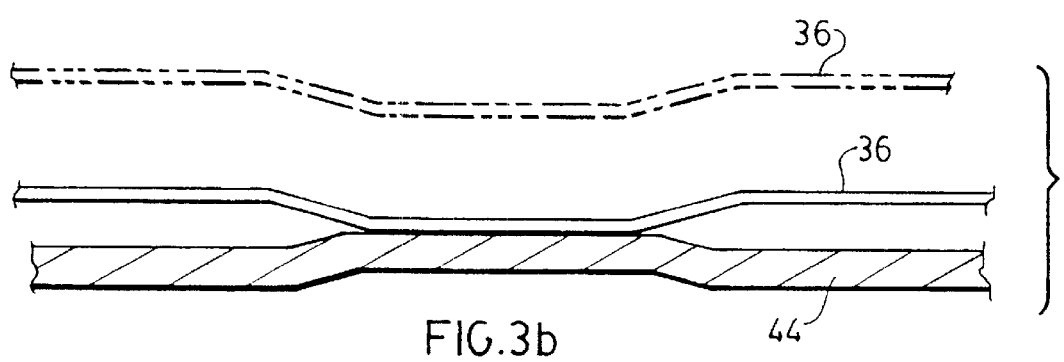

FIG. 3a, 3b and 4 illustrate typical welding of the cover 36 to the tank body 32. In FIG. 3a, the cover 36 is connected to a side wall 45 of the tank body 32, preferably below a tank seam (not shown in FIG. 3a). In FIG. 3b, the cover 36 is connected to at least one point on the top wall 44 of the tank body 32.

In FIG. 4, the cover 36 is shown connected at two locations. First, the cover 36 is sealed at location 50 below the tank seam 37. In a preferred embodiment, the seam 37 is created in an area of the side wall 45 where the wall is indented inwards towards the fuel reservoir 40, therefore in this area the distance between the cover 36 and side wall 45 may be greater than 1 to 3 mm. The vapour collection chamber 34 therefore encapsulates the tank seam 37 to capture any hydrocarbon vapours leaking from the seam 37.

The second welding location 52 is on the top wall 44 of the tank body 32. It will be understood that there may not be any weld locations on the top wall 44, or there may be a plurality of such locations. For example, FIG. 6 shows the cover 36 connected to the top wall 44 at several locations 52.

Figure 5:
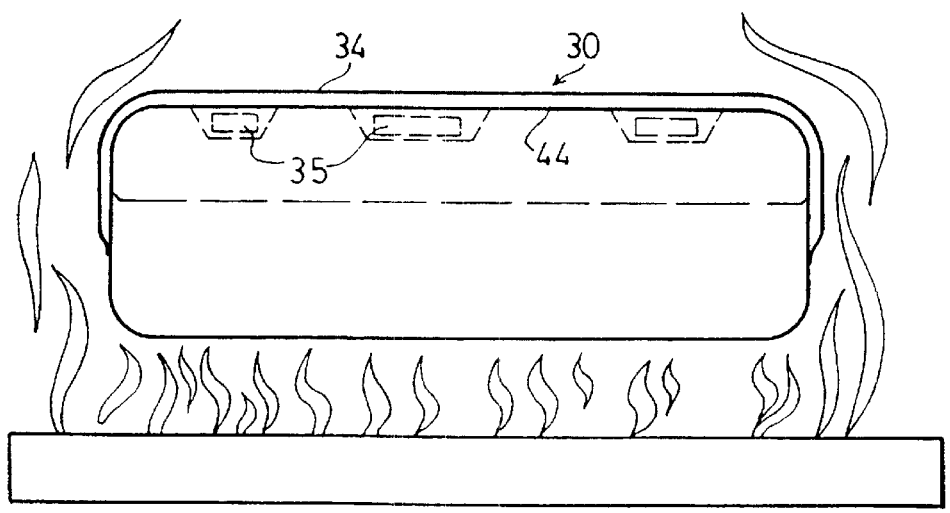
FIG. 5 illustrates the fire resistance properties of the fuel tank of the present invention.

There are several advantages associated with each of the various embodiments of the cover 36 and vapour collection chamber 34 of the present invention. They include the following:

1. The cover 32 is located over all fuel tank components 35 and seams 37 to create an encapsulated vapour collection chamber 34 where hydrocarbon vapours leaked from the tank body 32 are captured;
2. The multilayered fuel tank 30 of the present invention will allow virtually no hydrocarbon vapour emissions to the environment over the average lifetime of a motor vehicle. This in contrast to currently available fuel tanks that experience an increase in hydrocarbon vapour emissions released due to the aging of the unprotected tank components on the top of the fuel tank;
3. Currently available fuel tank designs can be used with the cover 36 because the tank components 35, such as the hoses, connectors, charcoal canister filter, etc. do not have to be altered in any way for the cover 36 to be used to collect hydrocarbon vapour emissions;
4. Most, if not all, of the fuel tank seams 37 are inside the vapour collection chamber 34, therefore capturing all hydrocarbon vapour emissions from the seams 37 and preventing them from escaping to the environment;
5. The hydrocarbon vapours captured within the vapour collection chamber 34 are then directed to the charcoal canister filter 39 and subsequently sent to the engine for burning;
6. As all fuel tank components 35 are located in the vapour collection chamber 34 defined by the cover 36, they are provided with extra protection from damage during shipping of the fuel tank 30 to the assembly plant, installation of the fuel tank 30 in a motor vehicle and during impacts such as accidents, crash tests, etc.;
7. The top walls of currently used plastic fuel tanks tend to flex during negative pressure conditions inside the reservoir of the tank body. The addition of the cover 36 with its bonding at several locations on the top wall 44 provides additional stiffness to the top wall 44 of the tank body 32;
8. The vapour collection chamber 34 also provides additional fire protection to the top wall 44 and tank components 35, which are especially vulnerable during fire tests where the tank top is especially vulnerable in a fire (FIG. 5);
9. The cover 36 acts as an additional barrier to prevent fuel leaks from damaged tank components as a result of an accident, thereby increasing the motor vehicle safety; and
10. The cover 36 creates a double wall for the top portion 42 of the fuel tank 30, which provides additional dampening of noise (illustrated by the arrows) created by the fuel pump 48 in the fuel tank 30 (FIG. 6).

Also provided in this invention is a method of making a multilayered fuel tank 30 for preventing the escape of hydrocarbon fuel vapour to the environment. The method generally comprises the steps of:

(a) providing a fuel tank body 32 for holding liquid fuel 33 and vapour comprising a top wall 44 and a number of fuel tank components 35 and seams 37 located on the top wall 44; and (b) connecting the cover 36 to the fuel tank body 32. The cover 36 defines the vapour collection chamber 34 and encapsulates the top wall 44 and the fuel tank components 35 and seams 37 thereby trapping any hydrocarbon vapours that may escape from the tank body 32, the fuel tank components 35 and the seams 37 when in use.

Further, there is also provided a method of preventing fuel hydrocarbon vapour from escaping from a fuel tank 30 to the environment. The method includes:

(a) providing a fuel tank body 32 for holding liquid fuel 33 and vapour comprising a top wall 44, and a number of fuel tank components 35 and seams 37 located on the top wall 44;

(b) connecting the cover 36 to the fuel tank body 32, the cover 36 defining a vapour collection chamber 34 and encapsulating the top wall 44 and the fuel tank components 35 and seams 37. Fuel hydrocarbon vapours are thereby trapped rather than escaping from the tank body 32, the fuel tank components 35 and the seams 37 to the environment; and (c) directing the trapped fuel hydrocarbon vapours through the charcoal cannister filter 39 to the motor vehicle engine for combustion.

Although the present invention has been shown and described with respect to its preferred embodiments, it will be understood by those skilled in the art that other changes, modifications, additions and omissions may be made without departing from the substance and the scope of the present invention as defined by the attached claims.

What is claimed is:

1. A multilayered fuel tank for a motor vehicle, comprising:
   (a) a fuel tank body for holding liquid and vapour fuel comprising a bottom wall, side walls and a top wall;
   (b) a plurality of fuel tank components located on the top wall and scams located on the side walls; and
   (c) a tank cover connected to an upper portion of the fuel tank body and defining a vapour collection chamber around the upper portion of the fuel tank, the tank cover protecting and encapsulating the top wall and the fuel tank components and seams thereby trapping any fuel vapours that escape from the tank body, the fuel tank components and the seams.

2. The multilayered fuel tank of claim 1, wherein the tank cover and tank body are made of plastic material and the tank cover is bonded to the fuel tank using a bonding method selected from the group consisting of infrared contact free welding, ultrasonic welding and emabond.

3. The multilayered fuel tank of claim 1, further comprising a charcoal cannister filter in operative connection with the vapour collection chamber wherein any fuel vapour in the collection chamber is directed to and captured in the charcoal cannister filter.

4. The multilayered fuel tank of claim 3, wherein the charcoal cannister filter is also operatively connected to the motor vehicle engine such that the fuel vapour captured by the charcoal filter is then directed to the engine for combustion.

5. The multilayered fuel tank of claim 1, wherein the fuel tank components and seams comprise one or more of valves, hoses, connectors, tank body seams, and cables.

6. The multilayered fuel tank of claim 5, wherein the tank cover further provides mechanical protection for the tank components and seams during installation of the fuel tank or during a motor vehicle accident.

7. An accessory for a motor vehicle fuel tank comprising a bottom wall, side walls, a top wall, seams and a plurality of fuel tank components located on the top wall, the accessory comprising:
   a tank cover for connection to an upper portion of the fuel tank to define a vapour collection chamber around the upper portion of the fuel tank, the tank cover protecting and encapsulating the top wall, the fuel tank components ad the seems thereby trapping any fuel vapour that may escape from the tan body, the fuel tank components and the seams during use of the fuel tank.

8. The accessory of claim 7, wherein the fuel tank further comprises a charcoal cannister filter in operative connection with the vapour collection chamber and the motor vehicle engine wherein any fuel vapour in the collection chamber is directed to and captured in the charcoal cannister filter and then directed to the engine for combustion during operation of the motor vehicle.

9. A method of making a multilayered fuel tank for preventing the escape of fuel vapour to the environment, the method comprising:
   (a) providing a fuel tank body for holding liquid fuel and vapour comprising a bottom wall, side walls and a top wall mud a plurality of fuel tank components located on the top wall and scans located on the side walls; and
   (b) connecting a tank cover to an upper portion of the fuel tank body, the tank cover defining a vapour collection chamber around the upper portion of the fuel tank and protecting and encapsulating the top wall and the fuel tank components and seams thereby trapping any fuel vapours that may escape from the tank body, the fuel tank components and the seams when in use.

10. The method of claim 9, further comprising the step of:
    (a) operatively connecting a charcoal cannister filter with the vapour collection chamber and the motor vehicle engine wherein in use any fuel vapour in the collection chamber is directed to and captured in the charcoal cannister filter and then directed to the engine for combustion.

11. A method of preventing fuel vapour from escaping from a fuel tank for motor vehicles to the environment, comprising:
    (c) providing a fuel tank body for holding liquid fuel and vapour comprising a bottom wall, side walls and a top wall, and a plurality of fuel tank components located on the top wall and seams located on the side walls;
    (d) connecting a tank cover to an upper portion of the fuel tank body, the tank cover defining a vapour collection chamber around the upper portion of the fuel tank and protecting and encapsulating the top wall and the fuel tank components and seams thereby trapping any fuel vapours that may escape from the tank body, the fuel tank components and the seams; and
    (e) directing the trapped fuel vapours through a charcoal cannister filter to the motor vehicle engine for combustion.

12. The multi-layered fuel tank of claim 1, wherein the tank cover is connected to the fuel tank body at a plurality of locations, at least one location is on the side walls between the seams and the bottom wall, and at least one location is on the top wall.

13. The multi-layered fuel tank of claim 12, wherein the tank cover is connected to the fuel tank body at a plurality of locations on the top wall, so as to provide additional stiffness to the top wall and additional dampening of noise created by a fuel pump located on the top wall.

14. The accessory of claim 7, wherein the tank cover is connected to the fuel tank body at a plurality of locations, at least one location is on the side walls between the seams and the bottom wall, and at least one location is on the top wall.

15. The accessory of claim 13, wherein the tank cover is connected to the fuel tank body at a plurality of locations on the top wall, so as to provide additional stiffness to the top wall and additional dampening of noise created by a fuel pump located on the top wall.

16. The method of claim 9, in which the tank cover is connected to the fuel tank body at a plurality of locations on the top wall, so as to provide additional stiffness to the top wall and additional dampening of noise created by a fuel pump located on the top wall.

17. The method of claim 16, wherein the tank cover is connected to the fuel tank body at a plurality of locations on the top wall, so as to provide additional stiffness to the top wall and additional dampening of noise created by a fuel pump located on the top wall.

* * * * *